Dec. 11, 1945. E. A. WEINBERG 2,390,972

VALVE LOCK

Filed Sept. 1, 1944

INVENTOR.

Edwin A. Weinberg

BY

ATTORNEY

Patented Dec. 11, 1945

2,390,972

UNITED STATES PATENT OFFICE 2,390,972

VALVE LOCK

Edwin A. Weinberg, Troy, N. Y., assignor to The Ludlow Valve Manufacturing Co., Inc., Troy, N. Y., a corporation of New York Application September 1, 1944, Serial No. 552,323

6 Claims. (Cl. 70—180)

My invention relates to valves and particularly to the combination with a valve of a means for locking the valve in any position.

Locking devices for valves have heretofore been proposed but many of them have no means of adjustment to compensate for valve wear during service, and such locking devices as are adjustable are faulty and expensive.

The principal object of my invention is to provide a simple, cheap and easily applied device for locking the stem of the valve in any position, and one which may be easily adjusted to compensate for wear in the valve.

With these objects in view my invention includes the novel elements and the combinations and arrangements thereof described below and illustrated in the accompanying drawing in which—

Referring to the drawing—

1 generally represents a globe valve having the bonnet 2 and the threaded stem 3 which may be turned to open and close the valve.

Figure 2:
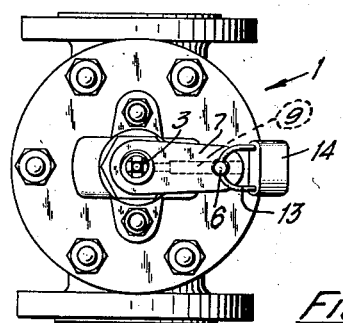
Fig. 2 is a top plan view of the valve and locking device.
Figure 1:
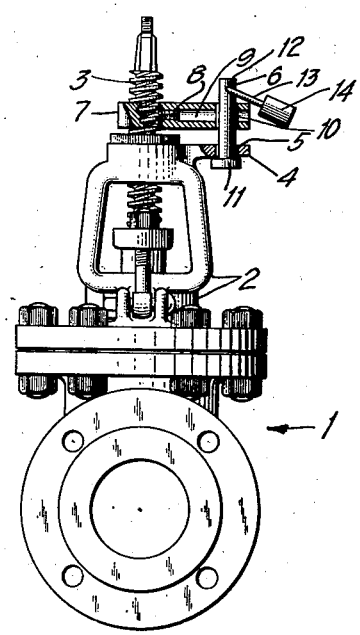
Fig. 1 is an elevation view, partially in section with certain portions broken away, of a globe valve equipped with my locking device.

In the species shown in Figs. 1 and 2 the bonnet is equipped with an ear 4 having a passage 5 therethrough adapted to receive the pin 6. A lug 7, here shown as threaded on the stem 3 but which may be closely fitted over the stem instead of being threaded thereon, is secured in fixed, adjusted relation to the stem by means of a set screw 8 in the bore 9 of the lug. The lug 7 is also provided with a passage 10 which intersects the bore 9 at right angles thereto and which is adapted to be positioned vertically over the passage 5 in the ear 4 and to permit the pin 6 to pass therethrough. The pin is provided with a head 11 at one end and a passage 12 near the other end through which the hasp 13 of the padlock 14 may be passed. The pin 6 prevents access to the set screw 8 which clamps the lug 7 to the stem, and the padlock 14 prevents the pin 6 from being withdrawn. Thus, there is provided, in effect, two locking devices of which the set screw 8 is one and the padlock 14 is the other. When wear in the valve prevents the passage 10 from being in proper registration with the passage 5 when the stem is in the desired position it is a simple matter to loosen the set screw 8, turn the lug to the proper position, and tighten the set screw. Thus, a very simple and effective means is provided for compensating for valve wear.

Figure 3:
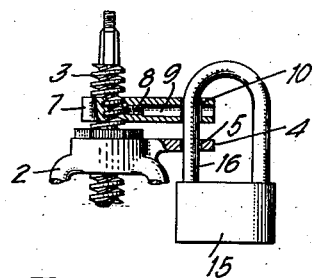
Fig. 3 is a fragmentary elevation view partially in section of a modification.

In Fig. 3 I have shown how the pin 6 may be dispensed with by using a padlock 15 with a long hasp 16 which may be passed both through the lug 7 and the ear 4 to prevent relative movement of these parts.

Figure 4:
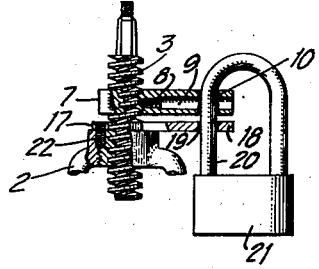
Fig. 4 is a view similar to Fig. 3 and illustrating a second modification.

In Fig. 4 instead of forming an ear on the bonnet, I form the yoke nut 17 with an ear 18 thereon which is provided with a passage 19 adapted to receive the hasp 20 of the padlock 21. The yoke nut is locked to the bonnet in the usual way by two set screws, only one of which 22 is shown; it being understood that the other one is diametrically opposite screw 22 and under the lug 7 so that it is inaccessible. As illustrated, the lug 7 is shown in somewhat spaced relation to the yoke nut but it may of course rest directly thereon and completely prevent access to the yoke nut set screw thereunder.

While I have described my invention in its preferred embodiment it is to be understood that the words which I have used are words of description rather than of limitation and that changes within the purview of the appended claims may be made without departing from the true scope and spirit of my invention.

What I claim is:

1. In a device of the character described, the combination with a valve, including a body and a stem movable with respect to said body for actuating said valve, of means closely engaging said stem but movable with respect thereto, means for securing said stem and said stem-engaging means together to prevent relative movement thereof, and means for locking said stem-engaging means and said body together to prevent relative movement thereof; said locking means, when locked, preventing access to said securing means.

2. In a device of the character described, the combination with a valve, including a body and a stem movable with respect to said body for actuating said valve, of means closely engaging said stem but movable with respect thereto, means for securing said stem and said stem-engaging means together to prevent relative movement thereof, removable means for securing said stem-engaging means and said body together to prevent relative movement thereof and also for preventing access to said securing means, and means for locking said removable means in operative position, 3. In a device of the character described, the combination with a valve, including a bonnet and a stem movable with respect to said bonnet for actuating said valve, of means closely engaging said stem but movable with respect thereto, means for securing said stem and said stem-engaging means together to prevent relative movement thereof, an ear on said bonnet, and means for locking said stem-engaging means and said ear together to prevent movement of said stem and also, when locked, for preventing access to said securing means.

4. In a valve including a body and a movable stem for actuating said valve, a lock for preventing relative movement of said stem and body and comprising a lug extending around said stem but movable with respect thereto, means for securing said lug and stem together to prevent relative movement thereof, and means for locking said lug against movement with respect to said body; said last mentioned means, when locked, preventing access to said means for securing said lug and stem together.

5. In a valve including a body and a movable stem for actuating said valve, a lock for preventing relative movement of said stem and body and comprising a lug surrounding and closely engaging said stem; said lug and stem being relatively movable but said lug being provided with a threaded bore therein and having a set screw in and cooperating with said threaded bore adapted to secure said lug in fixed relation to said stem; and means for locking said lug and said body together to prevent relative movement thereof; said locking means extending through said lug and transversely through said bore to block the latter and thereby prevent access to said set screw.

6. In a valve including a body and a movable stem for actuating said valve, a lock adapted to prevent the opening of said valve when closed and comprising a fixed ear on said body projecting outwardly therefrom adjacent said stem, a lug rotatably engaging said stem and projecting outwardly therefrom, whereby it may be moved about said stem when said valve is closed to bring it into proximity to said ear, means for securing said lug in fixed relation to said stem when in proximity to said ear, and means for locking said lug and ear together; said locking means preventing access to said securing means when locked.

EDWIN A. WEINBERG.